US012465855B2

(12) United States Patent
Lei et al.

(10) Patent No.: US 12,465,855 B2
(45) Date of Patent: Nov. 11, 2025

(54) IN-GAME INFORMATION PROMPTING METHOD AND APPARATUS, ELECTRONIC DEVICE AND STORAGE MEDIUM

(71) Applicant: NETEASE (HANGZHOU) NETWORK CO., LTD., Zhejiang (CN)

(72) Inventors: Yuewen Lei, Zhejiang (CN); Jing Sun, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 139 days.

(21) Appl. No.: 18/280,145

(22) PCT Filed: Apr. 6, 2022

(86) PCT No.: PCT/CN2022/085310
§ 371 (c)(1),
(2) Date: Sep. 1, 2023

(87) PCT Pub. No.: WO2022/267616
PCT Pub. Date: Dec. 29, 2022

(65) Prior Publication Data

US 2024/0149162 A1 May 9, 2024

(30) Foreign Application Priority Data

Jun. 25, 2021 (CN) ......................... 202110713567.3

(51) Int. Cl.
*A63F 13/53* (2014.01)
*A63F 13/533* (2014.01)
(Continued)

(52) U.S. Cl.
CPC ........ *A63F 13/533* (2014.09); *A63F 13/5375* (2014.09); *A63F 13/56* (2014.09); *A63F 13/92* (2014.09); *A63F 2300/308* (2013.01)

(58) Field of Classification Search
CPC .......... A63F 13/40; A63F 13/45; A63F 13/50; A63F 13/52; A63F 13/533; A63F 13/537;
(Continued)

(56) References Cited

U.S. PATENT DOCUMENTS

| | | | | |
|---|---|---|---|---|
| 2013/0072296 | A1* | 3/2013 | Miyazaki | A63F 13/10 463/31 |
| 2015/0111641 | A1* | 4/2015 | Timm | A63F 13/55 463/31 |
| 2018/0005429 | A1* | 1/2018 | Osman | A63F 13/56 |
| 2019/0217203 | A1* | 7/2019 | Ryan | A63F 13/79 |

(Continued)

FOREIGN PATENT DOCUMENTS

| | | |
|---|---|---|
| CN | 111124133 A | 5/2020 |
| CN | 112337090 A | 2/2021 |

(Continued)

OTHER PUBLICATIONS

International Search Report and Written Opinion with regard to PCT/CN2022/085310 mailed Jul. 6, 2022.

(Continued)

*Primary Examiner* — Omkar A Deodhar
(74) *Attorney, Agent, or Firm* — BCF LLP

(57) ABSTRACT

An in-game information prompting method and apparatus, an electronic device, and a storage medium are provided. The method includes: in response to a movement instruction for a player character having an initial behavioral state displayed in a graphical user interface, controlling the player character to move in a game scene, and displaying a first game interface formed by the player character moving; in response to the player character executing a target interaction behavior on a target object in the game scene, control-
(Continued)

ling the initial behavioral state of the player character to be adjusted to a target behavioral state; and in response to the player character having the target behavior state being within a preset range of a non-player character, displaying an indication identification corresponding to the non-player character in the first game interface.

20 Claims, 6 Drawing Sheets

(51) Int. Cl.

| | |
|---|---|
| ***A63F 13/5375*** | (2014.01) |
| ***A63F 13/56*** | (2014.01) |
| ***A63F 13/92*** | (2014.01) |

(58) Field of Classification Search

CPC ...... A63F 13/5375; A63F 13/55; A63F 13/56; A63F 13/92; A63F 2300/308; A63F 2300/5533; A63F 2300/556; A63F 2300/60; A63F 2300/63; A63F 2300/6623

See application file for complete search history.

(56) References Cited

U.S. PATENT DOCUMENTS

| | | | | |
|---|---|---|---|---|
| 2019/0240570 | A1* | 8/2019 | Kuwatani | A63F 13/211 |
| 2020/0306640 | A1* | 10/2020 | Kolen | A63F 13/67 |
| 2022/0309364 | A1* | 9/2022 | Perry | A63F 13/56 |

FOREIGN PATENT DOCUMENTS

| | | | |
|---|---|---|---|
| CN | 112915532 | A | 6/2021 |
| CN | 113457147 | A | 10/2021 |
| EP | 1147796 | A2 | 10/2001 |

OTHER PUBLICATIONS

English Abstract for CN113457147 retrieved on Espacenet on Aug. 29, 2023.

English Abstract for CN112915532 retrieved on Espacenet on Aug. 29, 2023.

English Abstract for CN112337090 retrieved on Espacenet on Aug. 29, 2023.

English Abstract for CN111124133 retrieved on Espacenet on Aug. 29, 2023.

* cited by examiner

IN-GAME INFORMATION PROMPTING METHOD AND APPARATUS, ELECTRONIC DEVICE AND STORAGE MEDIUM

CROSS-REFERENCE TO RELATED APPLICATIONS

The present disclosure is the U.S. National Stage Application of PCT International Application No. PCT/CN2022/085310, filed on Apr. 6, 2022, which is based upon and claims the priority to the Chinese patent application with the filing No. 202110713567.3, filed on Jun. 25, 2021, and entitled "In-Game Information Prompting Method and Apparatus, Electronic Device and Storage Medium", the entire contents of both of which are incorporated herein by reference for all purposes.

TECHNICAL FIELD

The present disclosure relates to the technical field of games, in particular to an in-game information prompting method and apparatus, an electronic device, and a storage medium.

BACKGROUND

With the popularization and the use of Internet technology and terminals, users have more and more entertainment items such as games. With the development of game items, asymmetric competitive games are born. In such games, the number of player characters in different camps is not the same, and the player characters of a certain camp complete their tasks by disguising themselves and escape from the pursuit of the player characters of the enemy camp. While the player character of a certain camp completes the task, there may be a risk of being identified in disguise, and at the same time, the non-player character near the player character will enter a threat state and pursue the player character.

In related technologies, when a non-player character enters a threat state, the player needs to judge the threat state of the non-player by himself. In this way, on the one hand, the player needs to spend a lot of time to judge the state of the non-player character; on the other hand, when the non-player character is not in the player's field of vision, the player cannot respond to the non-player character in the threat state in time, so that the player cannot effectively avoid the danger of being attacked by the non-player character in time, resulting in the failure of the player character's tasks. How to prompt the threat to the player character in time and effectively has become an urgent problem to be solved.

SUMMARY

A first aspect of the present disclosure provides an in-game information prompting method, including: displaying, by a terminal, a player character with an initial behavior state in a graphical user interface, where a game scene of the game includes the player character and a plurality of non-player characters, the graphical user interface is provided through the terminal, and at least part of the game scene is displayed on the graphical user interface; controlling the player character to move in the game scene, and displaying a first game interface formed according to a movement of the player character in response to a movement instruction for the player character with the initial behavior state; controlling the initial behavior state of the player character to be adjusted to a target behavior state in response to the player character performing a target interaction behavior on a target object in the game scene; and displaying an indication identification corresponding to the non-player characters in the first game interface in response to the player character with the target behavior state being in a preset range of the non-player characters.

A second aspect of the present disclosure further provides an electronic device, including a processor, a storage medium and a bus, where the storage medium stores machine-readable instructions executable by the processor, when the electronic device is running, the processor communicates with the storage medium through the bus, and the processor executes the machine-readable instructions to perform steps of an in-game information prompting method, where the information prompting method includes: displaying a player character with an initial behavior state in a graphical user interface, where a game scene of the game includes the player character and a plurality of non-player characters, the graphical user interface is provided through the electronic device, and at least part of the game scene is displayed on the graphical user interface; controlling the player character to move in the game scene, and displaying a first game interface formed according to a movement of the player character in response to a movement instruction for the player character with the initial behavior state; controlling the initial behavior state of the player character to be adjusted to a target behavior state in response to the player character performing a target interaction behavior on a target object in the game scene; and displaying an indication identification corresponding to the non-player characters in the first game interface in response to the player character with the target behavior state being in a preset range of the non-player characters.

A third aspect of the present disclosure further provides a non-transitory computer-readable storage medium, where a computer program is stored on the non-transitory computer-readable storage medium, and the computer program, when executed by a processor, performs steps of an in-game information prompting method, where the information prompting method includes: displaying a player character with an initial behavior state in a graphical user interface, where a game scene of the game includes the player character and a plurality of non-player characters, the graphical user interface is provided through a terminal, and at least part of the game scene is displayed on the graphical user interface; controlling the player character to move in the game scene, and displaying a first game interface formed according to a movement of the player character in response to a movement instruction for the player character with the initial behavior state; controlling the initial behavior state of the player character to be adjusted to a target behavior state in response to the player character performing a target interaction behavior on a target object in the game scene; and displaying an indication identification corresponding to the non-player characters in the first game interface in response to the player character with the target behavior state being in a preset range of the non-player characters.

BRIEF DESCRIPTION OF DRAWINGS

In order to more clearly illustrate the technical solutions of the embodiments of the present disclosure, the following drawings that need to be used in the embodiments will be briefly introduced. It is to be understood that the following drawings only show some embodiments of the present disclosure, so they shall not be regarded as limiting the scope. For those ordinarily skilled in the art, other relevant drawings may be obtained according to these drawings without creative efforts.

DETAILED DESCRIPTION

Figure 1:
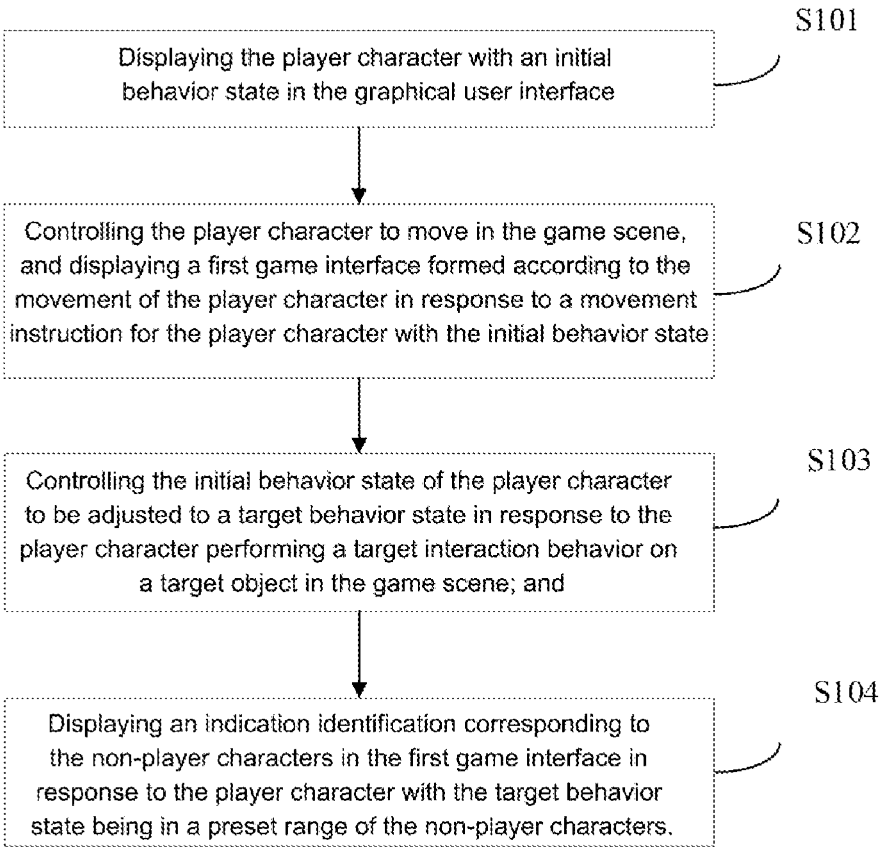
FIG. 1 is a flowchart of an in-game information prompting method provided by one or more embodiments of the present disclosure.

In order to make the objects, technical solutions and advantages of the embodiments of the present disclosure clearer, the technical solutions in the embodiments of the present disclosure will be clearly and completely described below with reference to the accompanying drawings in the embodiments of the present disclosure. Obviously, the described embodiments are only some rather than all of the embodiments of the present disclosure. Generally, the components of the embodiments of the present disclosure described and illustrated in the drawings herein may be arranged and designed in various different configurations. Therefore, the following detailed description of the embodiments of the present disclosure provided in the drawings is not intended to limit the claimed scope of protection of the present disclosure, but only represents selected embodiments of the present disclosure. Based on the embodiments of the present disclosure, every other embodiment obtained by those skilled in the art without making creative efforts shall fall within the scope of protection of the present disclosure.

With the popularization and the use of Internet technology and terminals, users have more and more entertainment items such as games. With the development of game items, asymmetric competitive games are born. In such games, the number of player characters in different camps is not the same, and the player characters of a certain camp complete their tasks by disguising themselves and escape from the pursuit of the player characters of the enemy camp. While the player character of a certain camp completes the task, there may be a risk of being identified in disguise, and at the same time, the non-player character near the player character will enter a threat state and pursue the player character.

Here, when a non-player character enters a threat state, the player needs to judge the threat state of the non-player by himself. In this way, on the one hand, the player needs to spend a lot of time to judge the state of the non-player character; on the other hand, when the non-player character is not in the player's field of vision, the player cannot respond to the non-player character in the threat state in time, so that the player cannot effectively avoid the danger of being attacked by the non-player character in time, resulting in the failure of the player character's tasks. It will also take a lot of time to analyze the state of the non-player characters, resulting in the slow progress of the game and affecting the efficiency of the game.

Further, with the application of the prompt information in the game scene, when the non-player character enters a threat state, a character state prompt identification will be displayed near the non-player character. In this scheme, when the non-player character is in the player character's field of vision, it may give a good prompt to the player character. When the non-player character is not in the player character's field of vision (for example, behind the player character), the prompt for the non-player character is difficult to be noted by the player character, which will lead the player to be unable to avoid the danger of being attacked by the non-player character in time and effectively, resulting in the failure of the player character's task. Therefore, how to prompt the threat to the player character in time and effectively has become an urgent problem to be solved.

According to the in-game information prompting method and apparatus, the electronic device and the storage medium provided by the embodiments of the present disclosure, the player character with the initial behavior state is displayed in the graphical user interface, the player character is controlled to move in the game scene according to the movement instruction for the player character, and the first game interface formed according to the movement of the player character is displayed in real time with the movement of the player character. When it is determined that the player character has performed the target interaction behavior on the target object in the game scene, the initial behavior state of the player character is adjusted to the target behavior state, and when the player character with the target behavior state is within the preset range of the non-player character, the indication identification corresponding to the non-player character is displayed in the first game interface. In the present disclosure, when the play character with the target behavior state is in the preset range of the non-player characters, the non-player characters are indicated to prompt the player character to pay attention to the threating non-player character. In this way, the player character may discover the threating non-player character in time, which is helpful to improve the timeliness rate and efficiency of the player character in avoiding danger.

To facilitate the understanding of this embodiment, the in-game information prompting method and apparatus, the electronic device and the storage medium provided by embodiments of the present disclosure will be introduced in detail. The embodiments of the present disclosure may be applied to the field of games, such as FPS (Frames Per Second) games or MMO (Massive Multiplayer Online) games. It is to be noted that the embodiments of the present disclosure are not limited to the above-mentioned types of games, nor are they limited to the field of games.

The information prompting method in the embodiments of the present disclosure may be run on a terminal or a server. The terminal may be a local terminal (such as a local touch control terminal). When the information prompting method runs on the server, it may be by means of cloud gaming.

In some embodiments, the cloud gaming refers to a game mode based on cloud computing. In the running mode of cloud gaming, the running subject of game programs and the presenting subject of game pictures are separated, the storage and running of information display methods are completed on the cloud gaming server, and the cloud gaming client is configured to receive and send data and present game pictures. For example, the cloud gaming client may be a display device with data transmission function close to the user side, such as a mobile terminal, a TV, a computer, a palmtop, etc. However, the terminal for presenting information is a cloud gaming server in the cloud. When playing games, users operate the cloud gaming client to send operation instructions to the cloud gaming server. The cloud gaming server runs the game according to the operation instructions, encodes and compresses data such as game pictures, and returns them to the cloud gaming client through the network. Finally, the cloud gaming client decodes and outputs the game pictures.

In some embodiments, the terminal may be a local terminal. The local terminal stores the game program and is configured to present the game pictures. The local terminal is configured to interact with the user through the graphical user interface, that is, the game program is conventionally downloaded and installed through the electronic device and run. The local terminal may provide the graphical user interface to the user in various ways, for example, it may be rendered and displayed on the display screen of the local terminal, or it may be provided to the user through holographic projection. For example, the local terminal may include a display screen for presenting a graphical user interface which includes a game picture, and a processor for running the game, generating the graphical user interface, and controlling the display of the graphical user interface on the display screen.

The in-game information prompting method provided by the embodiments of the present disclosure may be run in the aforementioned local terminal or in the aforementioned cloud gaming client. The following takes the above in-game information prompting method which is run on a local terminal (hereinafter referred to as the terminal) as an example for illustration.

Please refer to FIG. 1, which is a flowchart of an in-game information prompting method provided by one or more embodiments of the present disclosure. As shown in FIG. 1, the in-game information prompting method provided by the embodiments of the present disclosure includes:

- S101: displaying the player character with an initial behavior state in the graphical user interface;
- S102: controlling the player character to move in the game scene, and displaying a first game interface formed according to the movement of the player character in response to a movement instruction for the player character with the initial behavior state;
- S103: controlling the initial behavior state of the player character to be adjusted to a target behavior state in response to the player character performing a target interaction behavior on a target object in the game scene; and
- S104: displaying an indication identification corresponding to the non-player characters in the first game interface in response to the player character with the target behavior state being in a preset range of the non-player characters.

According to the information prompting method provided by the embodiments of the present disclosure, the player character with the initial behavior state is displayed in the graphical user interface, the player character is controlled to move in the game scene according to the movement instruction for the player character, and the first game interface formed according to the movement of the player character is displayed in real time with the movement of the player character. When it is determined that the player character has performed the target interaction behavior on the target object in the game scene, the initial behavior state of the player character is adjusted to the target behavior state, and when the player character with the target behavior state is within the preset range of the non-player character, the indication identification corresponding to the non-player character is displayed in the first game interface. In the present disclosure, when the play character with the target behavior state is in the preset range of the non-player characters, the non-player characters are indicated to prompt the player character to pay attention to the threating non-player character. In this way, the player character may discover the threating non-player character in time, which is helpful to improve the timeliness rate and efficiency of the player character in avoiding danger.

Exemplary steps of the embodiments of the present disclosure are described below.

S101: displaying the player character with an initial behavior state in the graphical user interface.

In the embodiments of the present disclosure, the player character in the initial behavior state that has not performed the target interaction behavior is displayed in the graphical user interface.

Here, taking the game background of the present disclosure, the asymmetric competitive game, as an example, in this kind of game, the characters are roughly divided into two camps, one with two people and the other with four people. The player character of the present disclosure is in the camp with a larger number of people. For each player character, it is necessary to hide in the non-player characters through disguise, so as to infiltrate into the interior of the enemy through disguise, and complete the corresponding target task at the task site.

Here, the disguise control of the player character needs to refer to the surrounding environment of the current player and the dress of other non-player characters, so as to successfully hide in the non-player characters and not to be discovered by the player character of the enemy camp.

In the embodiments of the present disclosure, when a player character performs a target interaction behavior on a target object in a game scene, an illegal behavior label is generated, which is configured to make the non-player character perceive that the player character is performing the target interaction behavior on the target object.

Here, when the player character performs the target interaction behavior, an abnormality prompt icon will be displayed at the preset position of the player character, and this abnormality prompt icon may instruct the player character to perform the target interaction behavior.

Here, in addition to displaying the abnormality prompt icon at the preset position of the player character, the text information may also be displayed at the preset position of the player character. When the abnormality prompt icon is displayed at the preset position of the player character, and when the player character illegally moves a non-player character who is already in a dead state, an abnormality icon will be displayed on the head of the player character to prompt that the player character is performing a target interaction behavior.

With the prompt of text information, not only may the player character performing the target interaction behavior on the target object in the game scene be displayed, but also the specific type of the target interaction behavior on the target object in the game scene may be specifically displayed.

For the player character, when the player character performs the corresponding target interaction behavior, the player character will be marked by the illegal behavior label, so that the non-player character may perceive that the player character is performing the target interaction behavior, but when the player character may hide himself well, he is not marked with an illegal behavior label, that is, the player character is in the initial behavior state.

It is worth noting that the abnormality prompt icon displayed on the player character does not always exist. If the player character's target interaction behavior on the target object in the game scene is not discovered, after the player character ends the target interaction behavior on the target object in the game scene, the abnormality prompt icon will be cancelled, and then the player character will continue to hide in a plurality of non-player characters and continue to complete the target task.

S102: controlling the player character to move in the game scene, and displaying a first game interface formed according to the movement of the player character in response to a movement instruction for the player character with the initial behavior state.

In the embodiments of the present disclosure, the player character is controlled to move in various areas of the game scene in response to the movement instruction for the player character with the initial behavior state, and the first game interface formed during the movement of the player character is displayed in real time according to the movement of the player character.

Here, in the game, the player character needs to move in the game scene, and complete the corresponding game tasks by moving to different target areas to win the game.

Here, the movement instruction for the player character with the initial behavior state may be a touch control instruction issued by the user to the player character through the mobile terminal.

The touch control instruction may include sliding operation, click operation, long press operation, etc.

Here, the first game interface may be a game interface that is displayed in real time with the movement of the player character. For example, the player character moves in a corridor in the game scene, and the scenes on both sides of the corridor through which the player character passes may be displayed in real time in the game interface. The game interface may also be switched according to the switching of the area where the player character walks. For example, by moving, the player character moves from the first scene area to the second scene area in the game scene, then the game interface will be switched according to the movement of the player character, and the scene in the second scene area will be displayed in the first game interface. It is to be noted that when the player character in the initial behavior state moves in the game scene, the indication identification corresponding to the non-player character will not be displayed in the first game interface.

S103: controlling the initial behavior state of the player character to be adjusted to a target behavior state in response to the player character performing a target interaction behavior on a target object in the game scene.

In the embodiments of the present disclosure, in response to the target interaction behavior performed by the player character on the target object in the game scene, the initial behavior state of the player character is controlled to be adjusted to the target behavior state.

Here, according to the above definition, the initial behavior state is a state where the player character does not perform the target interaction behavior on the target object in the game scene. In some embodiments, the initial behavior state is a state in which the player character is not marked with an illegal behavior label, and then the target behavior state refers to a state in which the player character is marked with an illegal behavior label after the player character performs the target interaction behavior on the target object.

Here, when the player character is in the target behavior state, the player character is in the state of being identified in disguise, and then the non-player character may be triggered to enter the corresponding attack state, thus posing a threat to the player character.

Here, the player character's target interaction behavior on the target object in the game scene includes at least one of the following: the player character attacking other non-player characters, the player character moving another non-player character who is already in a dead state, a dress of the player character not meeting clothing requirements of a current area, and the player character performing the target interaction behavior on the target virtual goods.

Here, for the game scene in the embodiments of the present disclosure, the task goal of the player character is to crack the key information, and then complete the evacuation. The player character may crack the key information in any one of the three password facilities in the game map by inputting a correct four-digit password, and the player character may go to a specific area of the game map and crack the dynamic safety device to obtain the dynamic password.

For the above-mentioned game scenes, the target interaction behavior of the player character on the target virtual goods refers to the point occupying interaction of the player character approaching the closed dynamic safety device in the game scene.

S104: displaying an indication identification corresponding to the non-player characters in the first game interface in response to the player character with the target behavior state being in a preset range of the non-player characters.

In the embodiments of the present disclosure, when it is determined that the player character with the target behavior state is within the preset range of the non-player character, the indication identification corresponding to the corresponding non-player character is displayed in the first game interface.

Here, in the game scene, except for the player characters of different camps, others are basically non-player characters, so for the player character with the target behavior state, there must be non-player characters who cannot see the player character with the target behavior state in the whole game scene. In the embodiments of the present disclosure, what needs to be discussed is the target non-player characters who "can see" the player character with the target behavior state.

The player character with the target behavior state being within the preset range of the non-player character means that the player character with the target behavior state is in the field of vision of the non-player character.

Here, during the setting of the game, each non-player character will set his own corresponding field of vision (visible distance range and visible angle range). When the player character is in the visible distance range and the visible angle range of the non-player character, it is deemed that the player character is in the preset range of the non-player character.

For example, when a certain non-player character is standing still, he may see a scene within 10 m (a scene distance in the game scene) with an angle range of head movement (without looking back). Then, when the player character is in front of 5 m (a scene distance in the game scene) from the non-player character, it is determined that the player character is in the preset range of the non-player character.

Here, an indication identification corresponding to the non-player character is displayed in the first game interface to prompt the position of the non-player character according to the indication identification.

Here, when the player character is in the target behavior state, it is necessary to prompt the player character, so as to prevent the player character from being captured or blocked by the non-player character, and the position of the non-player character is prompted by the indication identification.

The display style of the indication identification for prompting the non-player character may be determined according to the attack state of the non-player character and the position of the non-player character relative to the player character.

Here, at least one indication identification may be displayed in the first game interface, and the position area where the at least one indication identification is displayed may be around the player character, or a specific position area within the player's field of vision. The criterion for selection of the position area is that the prompt information displayed in this area may be seen by the player character and the player who controls the player character.

Here, for the display of the indication identification, the style may be an icon display style (for example, arrow, etc.), or a text information display style (the display text may be "There is a threating NPC in XX direction", etc.).

Here, taking the indication identification as an arrow icon as an example, for the display of the indication identification, an arrow icon may be displayed at the position of the non-player character relative to the player character, and the arrow icon points in the direction of the non-player character.

For example, if one of the non-player characters is located in the southwest of the player character, an arrow pointing to the southwest may be displayed in the southwest around the player character to prompt the player character that there is a non-player character in the southwest.

In some embodiments, the arrow icon is displayed in a 3DUI display mode, and may be displayed in all directions of the player character to obtain a more realistic display effect.

Here, in the actual process of the game, when the player character performs the target interaction behavior on the target object in the game scene, there may be more than one non-player characters that meet the condition that the player character is located in the preset range of the non-player characters. At this time, the display of the indication identification of the non-player character may include the following steps:

screening a preset number of non-player characters from a plurality of non-player characters, and displaying indication identifications corresponding to the preset number of non-player characters respectively in the first game interface.

For example, if there are N non-player characters that meet the condition that the player character is located in the preset range of the non-player characters, and the maximum number of displayed indication identifications is M, then it is necessary to screen out M non-player characters from the N non-player characters. The criterion for screening the M non-player characters may refer to the distance between each non-player character and the player character, and the M non-player characters are screened out from the N non-player characters in the order from near to far from the player character.

Further, the information prompting method further includes:

controlling the target behavior state of the player character to be restored to the initial behavior state in response to the end of the target interaction behavior.

In the embodiments of the present disclosure, the player character is restored from the target behavior state to the initial behavior state in response to the end of the target interaction behavior.

Here, if no non-player characters discover the player character during the player character's target interaction behavior on the target object in the game scene, after the player character's target interaction behavior on the target object ends, the target behavior state will be restored to the initial behavior state, so that the player may be better hidden among a plurality of non-player characters. After the player character is restored from the target behavior state to the initial behavior state, even if the player character is seen by other non-player characters, the other non-player characters will no longer pose a threat to the player character. Accordingly, it is not necessary to mark the non-player characters who see the player character.

For example, if the player character is seen by a non-player character A during performing the target interaction behavior on the target object in the game scene, the non-player character A will generate a threat value, and then the game interface will have a direction identification corresponding to the non-player character A. After that, the player character ends the target interaction behavior, and then, since the behavior state of the player character becomes the initial behavior state, at this time, even if it is seen by the non-player character B, the threat value will not be generated, that is, the direction identification corresponding to the non-player character A will not be generated in the game interface.

Further, in the embodiments of the present disclosure, the display of the indication identification corresponding to the non-player character in the first game interface may be determined according to the orientation information and the attack state of the non-player character, and the steps of determining the indication identification according to the orientation information and the attack state of the non-player character will be described below, respectively.

Firstly, according to the orientation information of the non-player character, the indication identification is determined.

Figure 2:
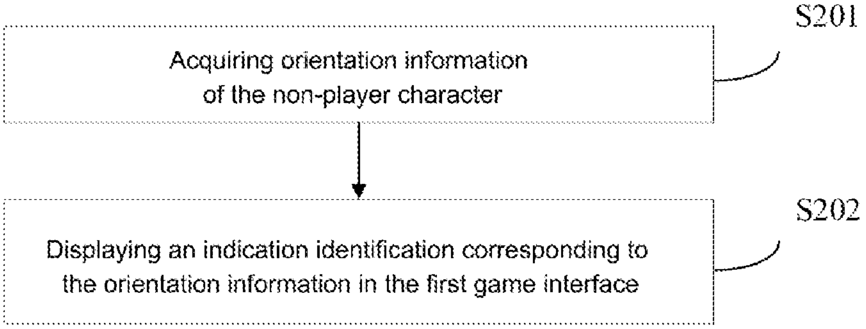
FIG. 2 is a flowchart of an in-game information prompting method provided by one or more embodiments of the present disclosure.

Please refer to FIG. 2, which is a flowchart of an in-game information prompting method provided by one or more embodiments of the present disclosure. As shown in FIG. 2, the information prompting method provided by the embodiments of the present disclosure includes:

S201: acquiring orientation information of the non-player character.

In the embodiments of the present disclosure, the orientation information of the non-player character to be acquired is the direction and the angle of the second position of the non-player character relative to the first position of the player character.

Here, the acquisition of the direction and the angle of the non-player character may be calculated by the world coordinates of the non-player character and the player.

S202: displaying an indication identification corresponding to the orientation information in the first game interface.

In the embodiments of the present disclosure, when the indication identification is displayed in the first game interface according to the orientation information, it is necessary to determine the indication direction of the indication identification and the position of the indication identification relative to the player character according to the direction and the angle of the second position of the non-player character relative to the first position of the player character.

Taking the indication identification as an arrow mark as an example, the indication identification may be determined by the following steps:

a1: determining a target direction and a target angle pointed by the arrow mark based on the orientation information; and a2: displaying the arrow mark in the first game interface according to the target direction and the target angle.

In the embodiments of the present disclosure, according to the orientation information, the direction and the angle of the non-player character relative to the player character are determined, and according to the determined direction and angle, the target direction and the target angle pointed by the corresponding arrow mark are determined, and the arrow mark is rendered in the first game interface according to the determined target direction and target angle, so that the arrow mark points to the position of the corresponding non-player character.

In some embodiments, taking the indication identification as an arrow mark for example, if one of the non-player characters is located in the southwest of the player character, an arrow pointing to the southwest may be displayed in the southwest around the character of the player to prompt the player that there is a non-player character in the southwest.

Here, for a player character, when the player character performs the target interaction behavior on the target object, the number of non-player characters in the preset range may be more than one. At this time, according to the second position of each non-player character relative to the first position of the player character, a plurality of indication identifications may be displayed around the player character.

Here, when the plurality of indication identifications are displayed, taking the position of the non-player character indicated by each indication identification that may be seen by the player character as a standard, the capture or blocking of the non-player character may be avoided according to the indication of each indication identification.

Secondly, according to the attack state of the non-player character, the indication identification is determined.

Figure 3:
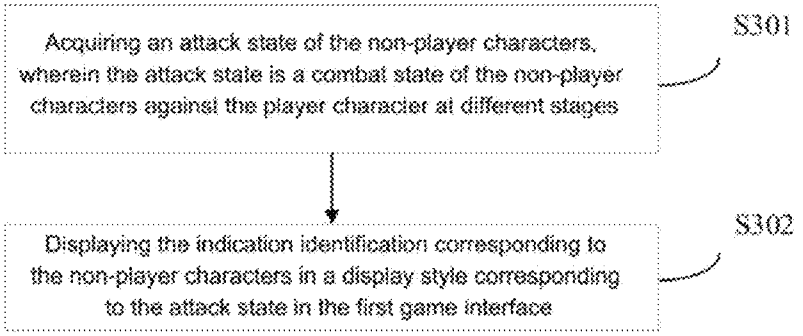
FIG. 3 is a flowchart of an in-game information prompting method provided by one or more embodiments of the present disclosure.

Please refer to FIG. 3, which is a flowchart of an in-game information prompting method provided by one or more embodiments of the present disclosure. As shown in FIG. 3, the information prompting method provided by the embodiments of the present disclosure includes following steps.

S301: acquiring an attack state of the non-player characters, where the attack state is a combat state of the non-player characters against the player character at different stages.

In the embodiments of the present disclosure, the attack state of the non-player character is acquired, where the attack state is the combat state of the non-player character against the player character at different stages, which will change with time and with the threat value of the non-player character.

Here, the attack state of the non-player character will be stimulated when the player character performs the target interaction behavior on the target object in the game scene and is seen by the non-player character. If it is in daily behavior (the player character does not perform the target interaction behavior on the target object in the game scene or the non-player character does not see the target interaction behavior of the player character), the non-player character is in a normal state and moves in the game scene according to the initial action logic.

The attack state includes a threat state, an engagement state and a pursuit state, and when there are a plurality of non-player characters, only one non-player character will enter the pursuit state by default.

S302: displaying the indication identification corresponding to the non-player characters in a display style corresponding to the attack state in the first game interface.

In the embodiments of the present disclosure, the indication identification is displayed in the first game interface in a display style corresponding to the attack state.

Here, according to the different attack states of non-player characters, there are differences in the styles of indication identifications displayed by non-player characters. In some embodiments, the rendering colors or styles of indication identifications may be different.

For example, the indication identifications corresponding to non-player characters in the pursuit state may be rendered red, while the indication identifications corresponding to non-player characters in threat state and engagement state may be rendered white, etc., because the threat of non-player characters in the pursuit state to player character is far greater than that of other non-player characters not in the pursuit state. It is necessary to highlight the indication identifications of non-player characters in the pursuit state.

Further, in the embodiments of the present disclosure, before the step of "acquiring the attack state of the non-player character", the information prompting method further includes:

triggering the non-player characters to enter the attack state in response to the player character with the target behavior state being in the preset range of the non-player characters.

In the embodiments of the present disclosure, when it is determined that the player character with the target behavior state is within the preset range of the non-player character, the non-player character is triggered to enter the attack state. After the non-player character enters the attack state, the threat value corresponding to the non-player character will increase according to the preset rate, and when the threat value increases to the preset threat threshold value, the attack state of the non-player character will change.

Further, the step of triggering the non-player characters to enter the attack state in response to the player character with the target behavior state being in the preset range of the non-player characters includes at least one of the following steps:

b1: controlling the non-player characters to enter a threat state in response to the player character with the target behavior state being in the preset range of the non-player characters; and b2: controlling the non-player characters to enter an engagement state from the threat state in response to a threat value of the threat state of the non-player characters reaching a preset threat threshold value; and b3: acquiring an order of the plurality of non-player characters entering the engagement state, determining a first non-player character from the plurality of non-player characters entering the engagement state according to the order of the plurality of non-player characters entering the engagement state, and controlling the first non-player character to enter a pursuit state from the engagement state.

Here, when it is determined that the player character with the target behavior state (marked with illegal behavior label) is in the preset range (field of vision) of the non-player character, all the non-player characters who see the player character with the target behavior state are controlled to enter the threat state, and the threat value of each non-player character starts to increase according to the preset rate.

Here, the increase rate of the threat value of the non-player characters is preset in the game settings, which may be set referring to the speed of performing the target interaction behavior by the historical player character. It is necessary to ensure as much as possible that there is a non-player character entering into a state of engagement before the end of the target interaction behavior of the player character.

Here, when the threat value of the non-player character entering the threat state reaches the preset threat threshold value, the non-player character is controlled to enter the engagement state from the threat state.

Here, the preset threat threshold value may be set in advance in the game settings, and the setting of the threat value of the non-player characters may be in a threat value interval, starting from 0 until reaching the preset threat threshold value, for example, the threat value interval [0,200], etc.

Here, there may be a process in which more than one non-player character sees the player character performing the target interaction behavior when the player character performs the target interaction behavior. According to the different time when each non-player character sees the player character performing the target interaction behavior, the time when each non-player character enters the threat state is also different. Because the increase rate of the threat value corresponding to each non-player character is the same, it means that the order of each non-player character entering the engagement state is different. According to the order of each non-player character entering the engagement state, the first non-player character is determined from a plurality of non-player characters entering the engagement state, and the attack state of the determined first non-player character is controlled to enter the pursuit state from the engagement state.

Here, the first non-player character refers to the non-player character firstly entering the engagement state among a plurality of non-player characters entering the engagement state.

Here, according to the setting of the game scene in the embodiments of the present disclosure, only one non-player character will enter the pursuit state at the same time to pursue the player character. After the first non-player character firstly entering the engagement state ends the pursuit state, the second non-player character secondly entering the engagement state will enter the pursuit state to pursue the player character, and so on. Before the player character ends the target interaction, all the non-player characters entering the engagement state will pursue the player character according to the order of entering the engagement state.

Further, when the non-player character enters the pursuit state, the action configuration of the non-player character will also change. At the initial stage of the game, each non-player character is configured to act in the game scene according to the initial action logic. Then, after the non-player character enters the pursuit state, the information prompting method further includes:

controlling the non-player characters to be adjusted to move to the player character from acting in the game scene according to the initial action logic in response to controlling the first non-player character to enter the pursuit state from the engagement state.

In the embodiments of the present disclosure, when the first non-player character enters the pursuit state from the engagement state, it will no longer move in the game scene according to the initial action logic, and the movement direction of the non-player character will be adjusted to the direction of the player character, thus completing the process of the non-player character pursuing the player character.

Here, at the initial stage of the game, each non-player character will act or perform the corresponding game task according to the preset trajectory in the game scene according to the setting of the initial action logic. When the first non-player character enters the pursuit state from the engagement state, the initial action logic for the first non-player character may not be movement towards the player character. Then, after the first non-player character enters the engagement state, it is necessary to adjust the action trajectory of the first non-player character to move towards the player character according to the direction of the current player character.

Further, after the end of the first non-player character's pursuit state against the player character, if the first non-player character is still in the survival state, it is necessary to adjust the first non-player character to the initial action logic again, so that the first non-player character moves in the game scene according to the initial action logic.

Further, when meeting the condition that the threat value stops increasing, the threat value of the non-player character will not increase, that is, the information prompting method further includes:

triggering the non-player character to restore from the attack state to the initial action state in response to a condition that the increase of the threat value of the threat state of the non-player characters stops.

where the condition that the increase of the threat value stops includes at least one of the following:

the player character moving out of the preset range of the non-player characters, and the player character stopping performing the target interaction behavior.

The player character moving out of the preset range of the non-player character means that the player character moves out of the field of vision of the non-player character. There are two cases in which the player character stops performing the target interaction behavior, one is that the player character interrupts performing the target interaction behavior, and the other is that the player character ends performing the target interaction behavior.

Here, for the non-player characters who have not yet reached the engagement state (the threat value of the threat state has not yet reached the preset threat threshold value) and are still in the threat state, when the stop increasing condition for the threat value is triggered, the threat value of these non-player characters will no longer increase, and the state of these non-player characters will also be restored from the attack state to the initial action state.

In the embodiments of the present disclosure, the above two modes of determining the indication identification according to the orientation information and the attack state of non-player characters may be combined with each other to determine the indication identification. The following will illustrate the process of determining the indication identification by combining the orientation information and the attack state of non-player characters.

Taking the indication identification as the arrow mark as an example, when the player character performs the target interaction behavior on the target object in the game scene and has the target state, the orientation information (direction and angle) of the non-player character relative to the player character is determined when the player character is in the preset range of the non-player character. If it is 45 degrees southwest, it is determined that the arrow mark points to the southwest at an angle of 45 degrees. At the same time, it is determined that the threat value of the non-player character entering the threat state has not reached the threshold value of the threat value, the non-player character is still in the threat state at this time, and the rendering color corresponding to the arrow mark is white. Then, it may be determined that the indication identification for this non-player character is a white arrow pointing to the southwest at an angle of 45 degrees.

Further, after the step of "displaying an indication identification corresponding to the non-player characters in the first game interface", the information prompting method further includes:

canceling the display of the indication identification corresponding to the non-player characters in the first game interface in response to a condition for canceling the display of the indication identification, where the condition for canceling the display includes at least one of the following:

reaching a display time of the indication identification, a distance between a second position of a non-player character and a first position of the player character being less than a preset distance threshold value, the player character being attacked by an enemy player character, the target non-player character being attacked by the player character, and the player character disappearing from the preset range of the target non-player character for a preset time threshold value.

Here, in the embodiments of the present disclosure, the display of the indication identification may be cancelled in two cases. One case is that when the non-player character is not in the pursuit state, the indication identification is more of a warning to the player character, which will roughly indicate the position and the direction of the non-player character. This indication identification may not always exist, and the display of the indication identification will be cancelled when the display time of the indication identification is reached. The other case is that when the non-player character is in the pursuit state, the threat to the player character will be greatly increased; at this time, it is necessary to show the real-time orientation information of the non-player character by indication identifications in real time, so as to prevent the player character from being captured or intercepted by the non-player character. In the latter case, the condition for canceling the display of the indication identification is that the non-player character stops performing the pursuit logic. In a specific game scene, the conditions for the non-player character to stop the pursuit logic may be that:

1, if the non-player character is close to the player within a certain distance, a close combat will be triggered, and at this time, the game interface will repeatedly play the animation of the player character strangling the non-player character until the player character or the non-player character knocks down the other;

2, the player character knocks down the non-player character;

3, the player character is attacked by the enemy players of the enemy camp; and 4, when the player character is out of the field of vision of all non-player characters in the engagement, one random non-player character will continue to pursue the player for a preset period of time, and if the player character is still not seen, the pursuit will stop.

It is worth noting that as long as any non-player character in the game scene is in the pursuit state, the indication identification of the non-player character will always indicate the non-player character in the pursuit state.

Taking the game background in which the player character is an infiltrator as an example, the prompting process of non-player characters in the present disclosure is elaborated. The prompting process of non-player characters includes the following steps.

Figure 4:
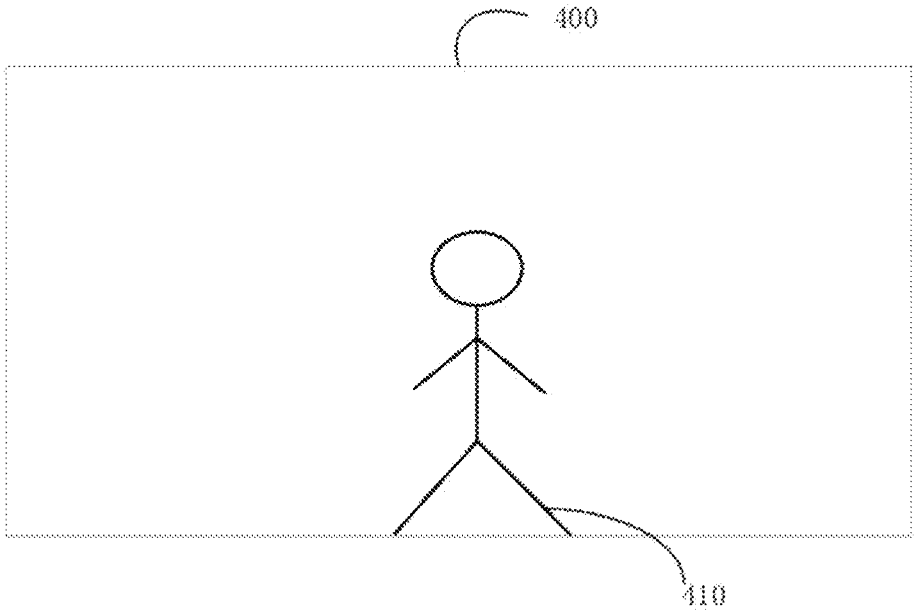
FIG. 4 is a schematic diagram of a game scene provided by one or more embodiments of the present disclosure.

Step one: referring to FIG. 4, which is a schematic diagram of the game scene provided by one or more embodiments of the present disclosure. A player character 410 is displayed in the graphical user interface 400, and there is no abnormality prompt icon displayed for the player character 410 at the preset position at this stage. Then, it is determined that the player character 410 is in the initial behavior state at present, and the player character 410 is controlled to move normally in the game scene.

Figure 5:
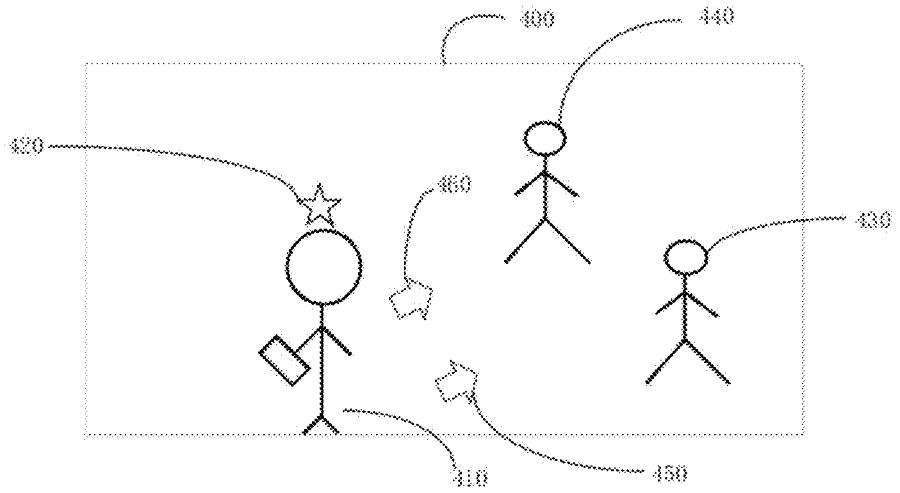
FIG. 5 is a schematic diagram of a game scene provided by one or more embodiments of the present disclosure.

Step two: referring to FIG. 5, which is a schematic diagram of the game scene provided by one or more embodiments of the present disclosure. When the player character 410 performs the point occupying interaction on the target object (dynamic safety device) in the game scene, at this time, it is determined that the player character 410 has performed an illegal operation in the game scene, and an abnormality prompt icon 420 is displayed near the player character 410, which determines that there are two non-player characters in the scene. They are non-player characters 430 and 440, respectively. The player character 410 is located in the field of vision of the non-player characters 430 and 440 when performing the point occupying interaction. At this time, the non-player characters 430 and 440 enter a threat state, and the corresponding first indication identification 450 and second indication identification 460 are determined according to the positional relationship between the non-player characters 430 and 440 and the player character 410, respectively, and displayed at a specific position of the player character 410.

Figure 6:
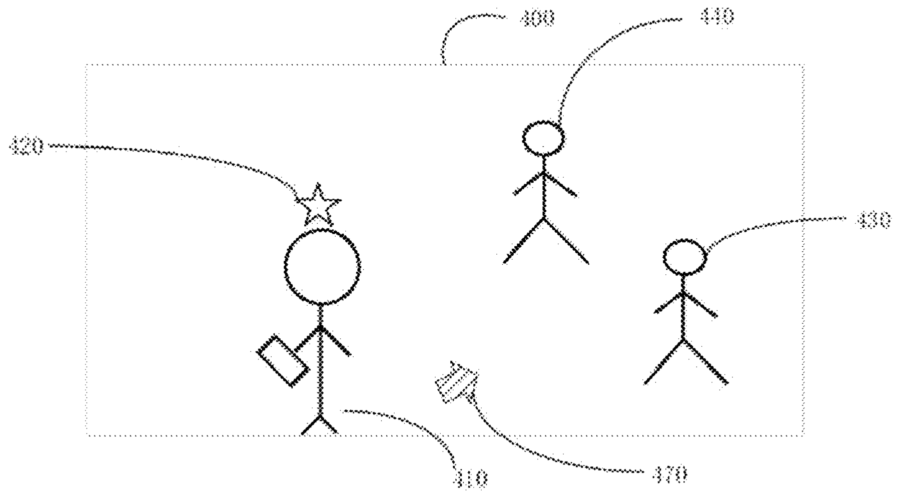
FIG. 6 is a schematic diagram of a game scene provided by one or more embodiments of the present disclosure.

Step three: referring to FIG. 6, which is a schematic diagram of the game scene provided by one or more embodiments of the present disclosure. After the preset time, the threat values of the threat states of the non-player characters 430 and 440 are both greater than the preset threat threshold value, and they all enter the engagement state, and the time when the non-player characters 430 enter the engagement state is earlier than that of the non-player characters 440. It is determined that the non-player character 430 enters the pursuit state. At this time, according to the positional relationship between the player character 410 and the non-player character 430, the third indication identification 470 corresponding to the non-player character 430 in the pursuit state needs to be displayed at the corresponding position.

Figure 7:
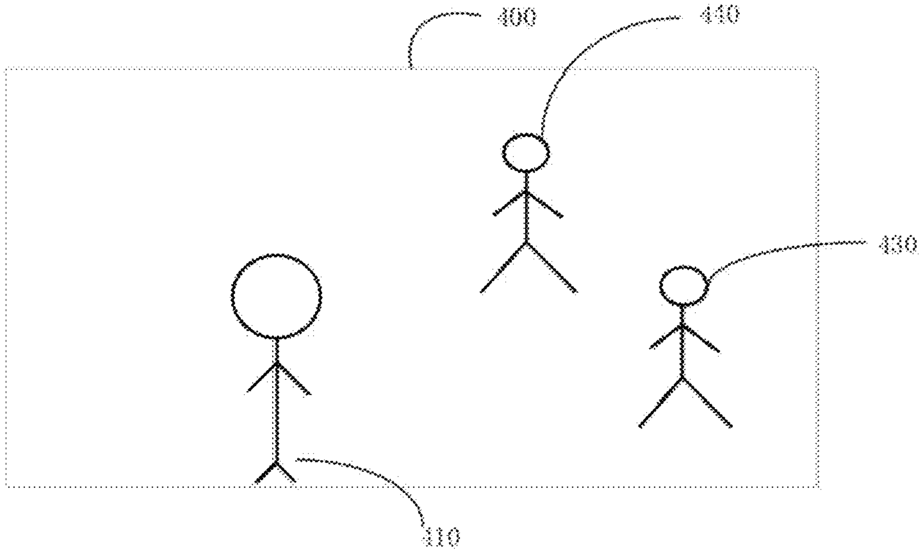
FIG. 7 is a schematic diagram of a game scene provided by one or more embodiments of the present disclosure.

Step four: referring to FIG. 7, which is a schematic diagram of the game scene provided by one or more embodiments of the present disclosure. After the player character 410 finishes performing the target interaction behavior, the display of the abnormality prompt icon is cancelled, and the player character 410 is restored to the initial behavior state and moves freely in the game scene, and the non-player characters 430 and 440 are no longer prompted according to the indication identifications.

According to the information prompting method provided by the embodiments of the present disclosure, the player character with the initial behavior state is displayed in the graphical user interface, the player character is controlled to move in the game scene according to the movement instruction for the player character, and the first game interface formed according to the movement of the player character is displayed in real time with the movement of the player character. When it is determined that the player character has performed the target interaction behavior on the target object in the game scene, the initial behavior state of the player character is adjusted to the target behavior state, and when the player character with the target behavior state is within the preset range of the non-player character, the indication identification corresponding to the non-player character is displayed in the first game interface. In the present disclosure, when the play character with the target behavior state is in the preset range of the non-player characters, the non-player characters are indicated to prompt the player character to pay attention to the threating non-player character. In this way, the player character may discover the threating non-player character in time, which is helpful to improve the timeliness rate and efficiency of the player character in avoiding danger.

Based on the same inventive concept, the embodiments of the present disclosure further provide an information prompting apparatus corresponding to the information prompting method. Since the principle of problem solving of the apparatus in the embodiment of the present disclosure is similar to that of the above information prompting method in the embodiments of the present disclosure, for the apparatus embodiments, reference may be made to the method embodiments, which will not be repeated here.

Figure 8:
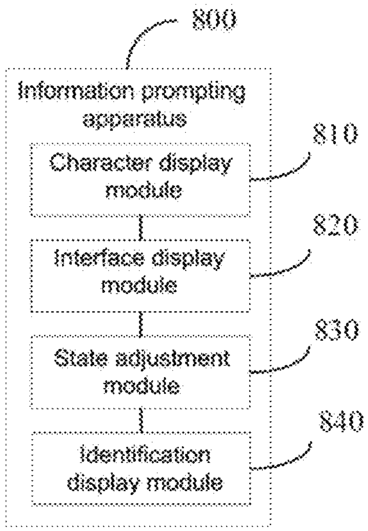
FIG. 8 is a structural schematic diagram of an information prompting apparatus provided by one or more embodiments of the present disclosure.
Figure 9:
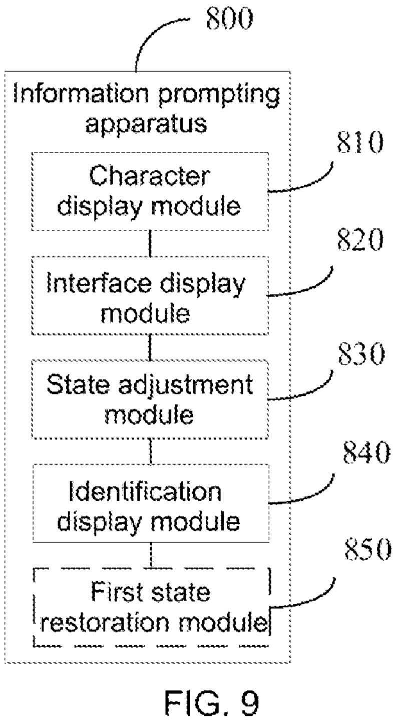
FIG. 9 is a structural schematic diagram of an information prompting apparatus provided by one or more embodiments of the present disclosure.
Figure 10:
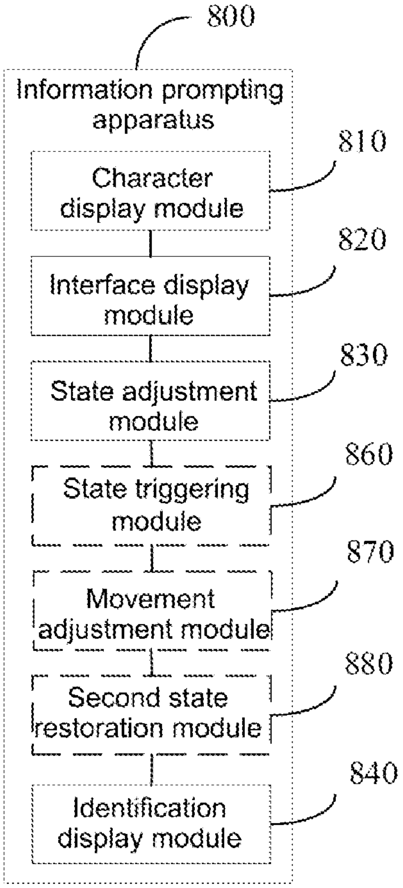
FIG. 10 is a structural schematic diagram of an information prompting apparatus provided by one or more embodiments of the present disclosure.
Figure 11:
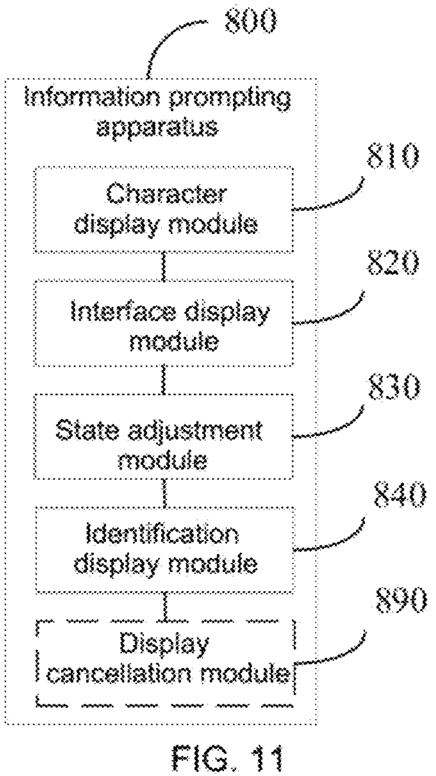
FIG. 11 is a structural schematic diagram of an information prompting apparatus provided by one or more embodiments of the present disclosure.

Referring to FIGS. 8 to 11, FIG. 8 is a structural schematic diagram of an information prompting apparatus provided by one or more embodiments of the present disclosure, FIG. 9 is a structural schematic diagram of an information prompting apparatus provided by one or more embodiments of the present disclosure, FIG. 10 is a structural schematic diagram of an information prompting apparatus provided by one or more embodiments of the present disclosure, and FIG. 11 is a structural schematic diagram of an information prompting apparatus provided by one or more embodiments of the present disclosure. As shown in FIG. 8, the information prompting apparatus 800 includes:

a character display module 810, configured to display the player character with an initial behavior state in the graphical user interface;

an interface display module 820, configured to control the player character to move in the game scene, and displaying a first game interface formed according to the movement of the player character in response to a movement instruction for the player character with the initial behavior state;

a state adjustment module 830, configured to control the initial behavior state of the player character to be adjusted to a target behavior state in response to the player character performing a target interaction behavior on a target object in the game scene; and an identification display module 840, configured to display an indication identification corresponding to the non-player characters in the first game interface in response to the player character with the target behavior state being in a preset range of the non-player characters.

Further, as shown in FIG. 9, the information prompting apparatus 800 further includes a first state restoration module 850, which is configured to:

controlling the target behavior state of the player character to be restored to the initial behavior state in response to the end of the target interaction behavior.

Further, as shown in FIG. 10, the information prompting apparatus 800 further includes a state triggering module 860, which is configured to:

triggering the non-player characters to enter the attack state in response to the player character with the target behavior state being in the preset range of the non-player characters.

Further, as shown in FIG. 10, the information prompting apparatus 800 further includes a movement adjustment module 870, which is configured to:

controlling the non-player characters to be adjusted to move to the player character from acting in the game scene according to the initial action logic in response to controlling the first non-player character to enter the pursuit state from the engagement state.

Further, as shown in FIG. 10, the information prompting apparatus 800 further includes a second state restoration module 880, which is configured to:

triggering the non-player character to restore from the attack state to the initial action state in response to a condition that the increase of the threat value of the threat state of the non-player characters stops, where the condition that the increase of the threat value stops includes at least one of the following:

the player character moving out of the preset range of the non-player characters, and the player character stopping performing the target interaction behavior.

Further, as shown in FIG. 11, the information prompting apparatus 800 further includes a display cancellation module 890, which is configured to:

canceling the display of the indication identification corresponding to the non-player characters in the first game interface in response to a condition for canceling the display of the indication identification;

where the condition for canceling the display includes at least one of the following:

reaching a display time of the indication identification, a distance between a second position of a non-player character and a first position of the player character being less than a preset distance threshold value, the player character being attacked by an enemy player character, the target non-player character being attacked by the player character, and the player character disappearing from the preset range of the target non-player character for a preset time threshold value.

Further, the player character performing the target interaction behavior on the target object in the game scene includes at least one of the following:

the player character attacking other non-player characters, the player character moving another non-player character who is already in a dead state, a dress of the player character not meeting clothing requirements of a current area, and the player character performing the target interaction behavior on target virtual goods.

Further, when the identification display module 840 is configured to display the indication identification corresponding to the non-player characters in the first game interface, the identification display module 840 is configured to:

acquiring orientation information of the non-player character; and displaying an indication identification corresponding to the orientation information in the first game interface.

Further, when the identification display module 840 is configured to display the indication identification corresponding to the non-player characters in the first game interface, the identification display module 840 is configured to:

acquiring an attack state of the non-player characters, where the attack state is a combat state of the non-player characters against the player character at different stages; and displaying the indication identification corresponding to the non-player characters in a display style corresponding to the attack state in the first game interface.

Further, when the state triggering module 860 is configured to trigger triggering the non-player characters to enter the attack state in response to the player character with the target behavior state being in the preset range of the non-player characters, the state triggering module 860 is configured to:

controlling the non-player characters to enter a threat state in response to the player character with the target behavior state being in the preset range of the non-player characters; and controlling the non-player characters to enter an engagement state from the threat state in response to a threat value of the threat state of the non-player characters reaching a preset threat threshold value; and acquiring an order of the plurality of non-player characters entering the engagement state, determining a first non-player character from the plurality of non-player characters entering the engagement state according to the order of the plurality of non-player characters entering the engagement state, and controlling the first non-player character to enter a pursuit state from the engagement state.

Further, the indication identification is an arrow mark, and when the identification display module 840 is configured to display the indication identification corresponding to the non-player characters in the first game interface, the identification display module 840 is configured to:

determining a target direction and a target angle pointed by the arrow mark based on the orientation information; and displaying the arrow mark in the first game interface according to the target direction and the target angle.

According to the information prompting apparatus provided by the embodiments of the present disclosure, the player character with the initial behavior state is displayed in the graphical user interface, the player character is controlled to move in the game scene according to the movement instruction for the player character, and the first game interface formed according to the movement of the player character is displayed in real time with the movement of the player character. When it is determined that the player character has performed the target interaction behavior on the target object in the game scene, the initial behavior state of the player character is adjusted to the target behavior state, and when the player character with the target behavior state is within the preset range of the non-player character, the indication identification corresponding to the non-player character is displayed in the first game interface. In the present disclosure, when the play character with the target behavior state is in the preset range of the non-player characters, the non-player characters are indicated to prompt the player character to pay attention to the threating non-player character. In this way, the player character may discover the threating non-player character in time, which is helpful to improve the timeliness rate and efficiency of the player character in avoiding danger.

Figure 12:
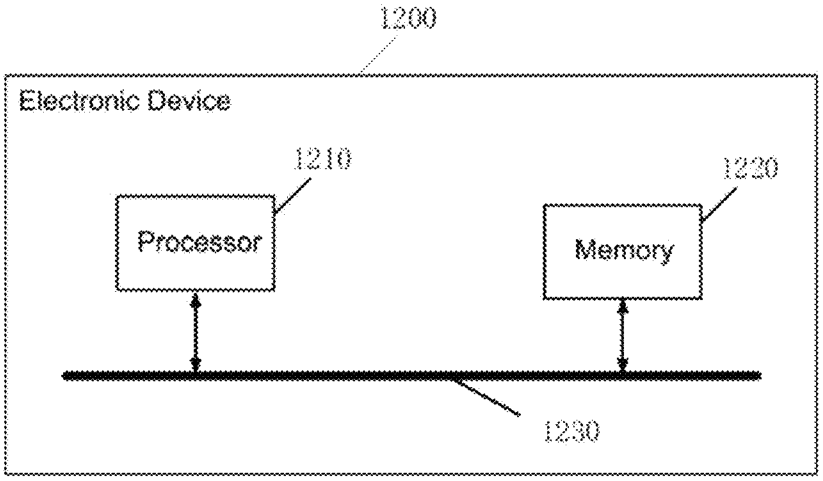
FIG. 12 is a structural schematic diagram of an electronic device provided by one or more embodiments of the present disclosure.

Referring to FIG. 12, which is a schematic structural schematic diagram of an electronic device provided by one or more embodiments of the present disclosure. As shown in FIG. 12, the electronic device 1200 includes a processor 1210, a memory 1220, and a bus 1230.

The memory 1220 stores machine-readable instructions executable by the processor 1210. When the electronic device 1200 is running, the processor 1210 communicates with the memory 1220 through the bus 1230. When the machine-readable instructions are executed by the processor 1210, the following steps of the information prompting method in the above-mentioned method embodiments shown in FIGS. 1 to 3 may be performed:

displaying the player character with an initial behavior state in the graphical user interface;

controlling the player character to move in the game scene, and displaying a first game interface formed according to the movement of the player character in response to a movement instruction for the player character with the initial behavior state;

controlling the initial behavior state of the player character to be adjusted to a target behavior state in response to the player character performing a target interaction behavior on a target object in the game scene; and displaying an indication identification corresponding to the non-player characters in the first game interface in response to the player character with the target behavior state being in a preset range of the non-player characters.

In some embodiments, the information prompting method further includes:

controlling the target behavior state of the player character to be restored to the initial behavior state in response to the end of the target interaction behavior.

In some embodiments, the player character performing the target interaction behavior on the target object in the game scene includes at least one of the following:

the player character attacking other non-player characters, the player character moving another non-player character who is already in a dead state, a dress of the player character not meeting clothing requirements of a current area, and the player character performing the target interaction behavior on target virtual goods.

In some embodiments, the step of displaying the indication identification corresponding to the non-player characters in the first game interface includes:

acquiring orientation information of the non-player character; and displaying an indication identification corresponding to the orientation information in the first game interface.

In some embodiments, the step of displaying the indication identification corresponding to the non-player characters in the first game interface includes:

acquiring an attack state of the non-player characters, where the attack state is a combat state of the non-player characters against the player character at different stages; and displaying the indication identification corresponding to the non-player characters in a display style corresponding to the attack state in the first game interface.

In some embodiments, the information prompting method further includes:

triggering the non-player characters to enter the attack state in response to the player character with the target behavior state being in the preset range of the non-player characters.

In some embodiments, the step of triggering the non-player characters to enter the attack state in response to the player character with the target behavior state being in the preset range of the non-player characters includes at least one of the following steps:

controlling the non-player characters to enter a threat state in response to the player character with the target behavior state being in the preset range of the non-player characters; and controlling the non-player characters to enter an engagement state from the threat state in response to a threat value of the threat state of the non-player characters reaching a preset threat threshold value; and acquiring an order of the plurality of non-player characters entering the engagement state, determining a first non-player character from the plurality of non-player characters entering the engagement state according to the order of the plurality of non-player characters entering the engagement state, and controlling the first non-player character to enter a pursuit state from the engagement state.

In some embodiments, the non-player characters are configured to act in the game scene according to an initial action logic, and the information prompting method further includes:

controlling the non-player characters to be adjusted to move to the player character from acting in the game scene according to the initial action logic in response to controlling the first non-player character to enter the pursuit state from the engagement state.

In some embodiments, the information prompting method further includes:

triggering the non-player character to restore from the attack state to the initial action state in response to a condition that the increase of the threat value of the threat state of the non-player characters stops, where the condition that the increase of the threat value stops includes at least one of the following:

the player character moving out of the preset range of the non-player characters, and the player character stopping performing the target interaction behavior.

In some embodiments, the indication identification is an arrow mark, and the step of displaying the indication identification corresponding to the non-player characters in the first game interface includes:

determining a target direction and a target angle pointed by the arrow mark based on the orientation information; and displaying the arrow mark in the first game interface according to the target direction and the target angle.

In some embodiments, after displaying the indication identification corresponding to the non-player characters in the first game interface, the information prompting method further includes:

canceling the display of the indication identification corresponding to the non-player characters in the first game interface in response to a condition for canceling the display of the indication identification, where the condition for canceling the display includes at least one of the following:

reaching a display time of the indication identification, a distance between a second position of a non-player character and a first position of the player character being less than a preset distance threshold value, the player character being attacked by an enemy player character, the target non-player character being attacked by the player character, and the player character disappearing from the preset range of the target non-player character for a preset time threshold value.

According to the electronic device provided by the embodiments of the present disclosure, when the play character with the target behavior state is in the preset range of the non-player characters, the non-player characters are indicated to prompt the player character to pay attention to the threating non-player character. In this way, the player character may discover the threating non-player character in time, which is helpful to improve the timeliness rate and efficiency of the player character in avoiding danger.

The specific embodiment contents of the in-game information prompting method run in this embodiment are also applicable to the aforementioned embodiment of the information prompting method in the game, which will not be repeated here.

The embodiments of the present disclosure further provide a computer-readable storage medium, a computer program is stored on the computer-readable storage medium, and the computer program, when executed by a processor, may perform the following steps of the information prompting method in the method embodiments shown in FIGS. 1 to 3: displaying the player character with an initial behavior state in the graphical user interface;

controlling the player character to move in the game scene, and displaying a first game interface formed according to the movement of the player character in response to a movement instruction for the player character with the initial behavior state;

controlling the initial behavior state of the player character to be adjusted to a target behavior state in response to the player character performing a target interaction behavior on a target object in the game scene; and displaying an indication identification corresponding to the non-player characters in the first game interface in response to the player character with the target behavior state being in a preset range of the non-player characters.

In some embodiments, the information prompting method further includes:

controlling the target behavior state of the player character to be restored to the initial behavior state in response to the end of the target interaction behavior.

In some embodiments, the player character performing the target interaction behavior on the target object in the game scene includes at least one of the following:

the player character attacking other non-player characters, the player character moving another non-player character who is already in a dead state, a dress of the player character not meeting clothing requirements of a current area, and the player character performing the target interaction behavior on target virtual goods.

In some embodiments, the step of displaying the indication identification corresponding to the non-player characters in the first game interface includes:

acquiring orientation information of the non-player character; and displaying an indication identification corresponding to the orientation information in the first game interface.

In some embodiments, the step of displaying the indication identification corresponding to the non-player characters in the first game interface includes:

acquiring an attack state of the non-player characters, where the attack state is a combat state of the non-player characters against the player character at different stages; and displaying the indication identification corresponding to the non-player characters in a display style corresponding to the attack state in the first game interface.

In some embodiments, the information prompting method further includes:

triggering the non-player characters to enter the attack state in response to the player character with the target behavior state being in the preset range of the non-player characters.

In some embodiments, the step of triggering the non-player characters to enter the attack state in response to the player character with the target behavior state being in the preset range of the non-player characters includes at least one of the following steps:

controlling the non-player characters to enter a threat state in response to the player character with the target behavior state being in the preset range of the non-player characters; and controlling the non-player characters to enter an engagement state from the threat state in response to a threat value of the threat state of the non-player characters reaching a preset threat threshold value; and acquiring an order of the plurality of non-player characters entering the engagement state, determining a first non-player character from the plurality of non-player characters entering the engagement state according to the order of the plurality of non-player characters entering the engagement state, and controlling the first non-player character to enter a pursuit state from the engagement state.

In some embodiments, the non-player characters are configured to act in the game scene according to an initial action logic, and the information prompting method further includes:

controlling the non-player characters to be adjusted to move to the player character from acting in the game scene according to the initial action logic in response to controlling the first non-player character to enter the pursuit state from the engagement state.

In some embodiments, the information prompting method further includes:

triggering the non-player character to restore from the attack state to the initial action state in response to a condition that the increase of the threat value of the threat state of the non-player characters stops, where the condition that the increase of the threat value stops includes at least one of the following:

the player character moving out of the preset range of the non-player characters, and the player character stopping performing the target interaction behavior.

In some embodiments, the indication identification is an arrow mark, and the step of displaying the indication identification corresponding to the non-player characters in the first game interface includes:

determining a target direction and a target angle pointed by the arrow mark based on the orientation information; and displaying the arrow mark in the first game interface according to the target direction and the target angle.

In some embodiments, after displaying the indication identification corresponding to the non-player characters in the first game interface, the information prompting method further includes:

canceling the display of the indication identification corresponding to the non-player characters in the first game interface in response to a condition for canceling the display of the indication identification, where the condition for canceling the display includes at least one of the following:

reaching a display time of the indication identification, a distance between a second position of a non-player character and a first position of the player character being less than a preset distance threshold value, the player character being attacked by an enemy player character, the target non-player character being attacked by the player character, and the player character disappearing from the preset range of the target non-player character for a preset time threshold value.

The specific embodiment contents of the in-game information prompting method run in this embodiment are also applicable to the aforementioned embodiment of the information prompting method in the game, which will not be repeated here.

According to the storage medium provided by the embodiments of the present disclosure, when the play character with the target behavior state is in the preset range of the non-player characters, the non-player characters are indicated to prompt the player character to pay attention to the threating non-player character. In this way, the player character may discover the threating non-player character in time, which is helpful to improve the timeliness rate and efficiency of the player character in avoiding danger.

It may be clearly understood by those skilled in the art that for the convenience and conciseness of the description, the specific working processes of the above-described systems, apparatuses and units may refer to the corresponding processes in the aforementioned method embodiments, which will not be repeated here.

From the several embodiments provided by the present disclosure, it is to be understood that the disclosed systems, apparatuses and methods may be implemented in other ways. The above-described apparatus embodiments are only schematic. For example, the division of the units is only a logical function division, and there may be another division mode in actual implementation. For example, a plurality of units or components may be combined or integrated into another system, or some features may be ignored or not performed. On the other hand, the shown or discussed mutual coupling or direct coupling or communication connection may be an indirect coupling or a communication connection through some communication interfaces, apparatuses or units, which may be in electrical, mechanical or in other forms.

The units described as separate parts may or may not be physically separated, and the parts displayed as units may or may not be physical units, that is, they may be located in one place or distributed over a plurality of network units. Some or all of the units may be selected according to the actual needs to achieve the purpose of the solution of the embodiments.

In addition, each functional unit in each embodiment of the present disclosure may be integrated in one processing unit, or each functional unit may physically exist separately, or two or more units may be integrated in one unit.

If the functions are implemented in the form of functional units for software and sold or used as independent products, they may be stored in a non-transitory computer-readable storage medium executable by a processor. Based on this understanding, the essential part of the technical solutions of the present disclosure or the part of the technical solutions that contributes to the related art may be embodied in the form of a software product, which is stored in a storage medium and includes a number of instructions to make a computer device (which may be a personal computer, a server, or a network device, etc.) perform all or some of the steps of the methods described in various embodiments of the present disclosure. The aforementioned storage media include: U disk, mobile hard disk, Read-Only Memory (ROM), Random Access Memory (RAM), magnetic disk or compact disc, and other media that may store program codes.

Finally, it is to be noted that the above-mentioned embodiments are only specific examples of the present disclosure, which are intended to illustrate, but not to limit the technical solutions of the present disclosure, and the scope of protection of the present disclosure is not limited to these embodiments. Although the present disclosure has been illustrated in detail with reference to the aforementioned embodiments, those ordinarily skilled in the art should understand that any skilled person familiar with the technical field may still modify or easily think of changes to the technical solutions described in the aforementioned embodiments within the technical scope disclosed in the present disclosure, or make equivalent substitution of some of the technical features. However, these modifications, changes or substitutions do not make the essence of the corresponding technical solutions deviate from the spirit and scope of the technical solutions of the embodiments of the present disclosure, and shall fall within the scope of protection of the present disclosure. Therefore, the scope of protection of the present disclosure shall be subject to the scope of protection of the claims.

What is claimed is:

1. An in-game information prompting method, comprising:

displaying, by a terminal, a player character with an initial behavior state in a graphical user interface, wherein a game scene of the game comprises the player character and a plurality of non-player characters, the graphical user interface is provided through the terminal, and at least part of the game scene is displayed on the graphical user interface;

controlling the player character to move in the game scene, and displaying a first game interface formed according to a movement of the player character in response to a movement instruction for the player character with the initial behavior state;

controlling the initial behavior state of the player character to be adjusted to a target behavior state in response to the player character performing a target interaction behavior on a target object in the game scene; and displaying an indication identification corresponding to the non-player characters in the first game interface in response to the player character with the target behavior state being in a preset range of the non-player characters.

2. The information prompting method according to claim 1, further comprising:

controlling the target behavior state of the player character to be restored to the initial behavior state in response to an end of the target interaction behavior.

3. The information prompting method according to claim 1, wherein the player character performing the target interaction behavior on the target object in the game scene comprises at least one of:

the player character attacking other non-player characters, the player character moving another non-player character who is already in a dead state, a dress of the player character not meeting clothing requirements of a current area, or the player character performing the target interaction behavior on target virtual goods.

4. The information prompting method according to claim 1, wherein displaying the indication identification corresponding to the non-player characters in the first game interface comprises:

acquiring orientation information of the non-player characters; and displaying the indication identification corresponding to the orientation information in the first game interface.

5. The information prompting method according to claim 4, wherein displaying the indication identification corresponding to the non-player characters in the first game interface comprises:

acquiring an attack state of the non-player characters, wherein the attack state is a combat state of the non-player characters against the player character at different stages; and displaying the indication identification corresponding to the non-player characters in a display style corresponding to the attack state in the first game interface.

6. The information prompting method according to claim 1, further comprising:

triggering the non-player characters to enter an attack state in response to the player character with the target behavior state being in the preset range of the non-player characters.

7. The information prompting method according to claim 6, wherein triggering the non-player characters to enter the attack state in response to the player character with the target behavior state being in the preset range of the non-player characters comprises at least one of:

controlling the non-player characters to enter a threat state in response to the player character with the target behavior state being in the preset range of the non-player characters;

controlling the non-player characters to enter an engagement state from the threat state in response to a threat value of the threat state of the non-player characters reaching a preset threat threshold value; or acquiring an order of the plurality of non-player characters entering the engagement state, determining a first non-player character from the plurality of non-player characters entering the engagement state according to the order of the plurality of non-player characters entering the engagement state, and controlling the first non-player character to enter a pursuit state from the engagement state.

8. The information prompting method according to claim 7, further comprising:

controlling the non-player characters to be adjusted to move to the player character from acting in the game scene according to an initial action logic in response to controlling the first non-player character to enter the pursuit state from the engagement state, wherein the non-player characters are configured to act in the game scene according to the initial action logic.

9. The information prompting method according to claim 7, further comprising:

triggering the non-player characters to restore from the attack state to an initial action state in response to a condition that an increase of the threat value of the threat state of the non-player characters stops, wherein the condition that the increase of the threat value stops comprises at least one of:

the player character moving out of the preset range of the non-player characters, or the player character stopping performing the target interaction behavior.

10. The information prompting method according to claim 4, wherein displaying the indication identification corresponding to the non-player characters in the first game interface comprises:

determining a target direction and a target angle pointed by an arrow mark based on the orientation information, wherein the indication identification is the arrow mark; and displaying the arrow mark in the first game interface according to the target direction and the target angle.

11. The information prompting method according to claim 1, further comprising:

canceling a display of the indication identification corresponding to the non-player characters in the first game interface in response to a condition for canceling the display of the indication identification, wherein the condition for canceling the display comprises at least one of:

reaching a display time of the indication identification, a distance between a second position of a non-player character and a first position of the player character being less than a preset distance threshold value, the player character being attacked by an enemy player character, a target non-player character being attacked by the player character, or the player character disappearing from a preset range of the target non-player character for a preset time threshold value.

12. An electronic device, comprising a processor, a storage medium and a bus, wherein the storage medium stores machine-readable instructions executable by the processor, when the electronic device is running, the processor communicates with the storage medium through the bus, and the processor executes the machine-readable instructions to perform steps of an in-game information prompting method, wherein the information prompting method comprises:

displaying a player character with an initial behavior state in a graphical user interface, wherein a game scene of the game comprises the player character and a plurality of non-player characters, the graphical user interface is provided through the electronic device, and at least part of the game scene is displayed on the graphical user interface;

controlling the player character to move in the game scene, and displaying a first game interface formed according to a movement of the player character in response to a movement instruction for the player character with the initial behavior state;

controlling the initial behavior state of the player character to be adjusted to a target behavior state in response to the player character performing a target interaction behavior on a target object in the game scene; and displaying an indication identification corresponding to the non-player characters in the first game interface in response to the player character with the target behavior state being in a preset range of the non-player characters.

13. A non-transitory computer-readable storage medium, wherein a computer program is stored on the non-transitory computer-readable storage medium, and the computer program, when executed by a processor, performs steps of an in-game information prompting method, wherein the information prompting method comprises:

displaying a player character with an initial behavior state in a graphical user interface, wherein a game scene of the game comprises the player character and a plurality of non-player characters, the graphical user interface is provided through a terminal, and at least part of the game scene is displayed on the graphical user interface;

controlling the player character to move in the game scene, and displaying a first game interface formed according to a movement of the player character in response to a movement instruction for the player character with the initial behavior state;

controlling the initial behavior state of the player character to be adjusted to a target behavior state in response to the player character performing a target interaction behavior on a target object in the game scene; and displaying an indication identification corresponding to the non-player characters in the first game interface in response to the player character with the target behavior state being in a preset range of the non-player characters.

14. The information prompting method according to claim 1, further comprising:

generating an illegal behavior label in response to that the player character performs the target interaction behavior on the target object in the game scene, wherein the illegal behavior label is configured to make the corresponding non-player character perceive that the player character is performing the target interaction behavior on the target object.

15. The information prompting method according to claim 1, wherein the player character with the target behavior state being in the preset range of the non-player characters indicates that the player character with the target behavior state is in a field of vision of the non-player characters.

16. The information prompting method according to claim 1, wherein displaying the indication identification corresponding to the non-player characters in the first game interface comprises:

screening a preset number of non-player characters from the plurality of non-player characters; and displaying indication identifications corresponding to the preset number of non-player characters respectively in the first game interface.

17. The information prompting method according to claim 4, wherein the orientation information of the non-player characters comprises a direction and an angle of a second position of the non-player character relative to a first position of the player character.

18. The information prompting method according to claim 7, wherein controlling the non-player characters to enter the threat state in response to the player character with the target behavior state being in the preset range of the non-player characters comprises:

controlling all the non-player characters who detect the player character with the target behavior state to enter the threat state in response to determining that the player character with the target behavior state is in the preset range of the non-player character; and increasing the threat value of each non-player character according to a preset rate.

19. The information prompting method according to claim 7, wherein the first non-player character is a non-player character firstly entering the engagement state among a plurality of non-player characters entering the engagement state.

20. The information prompting method according to claim 9, wherein the player character stopping performing the target interaction behavior comprises;

the player character interrupting performing the target interaction behavior; or the player character ending performing the target interaction behavior.

* * * * *